July 30, 1929.  J. R. OISHEI  1,722,535
RECIPROCATORY AUTOMATIC WINDSHIELD CLEANER
Filed Aug. 30, 1926  2 Sheets-Sheet 1
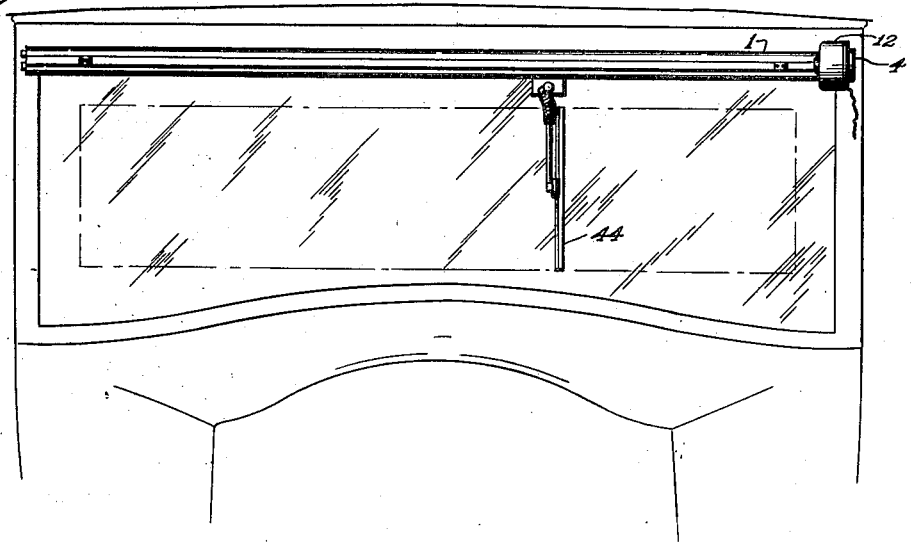
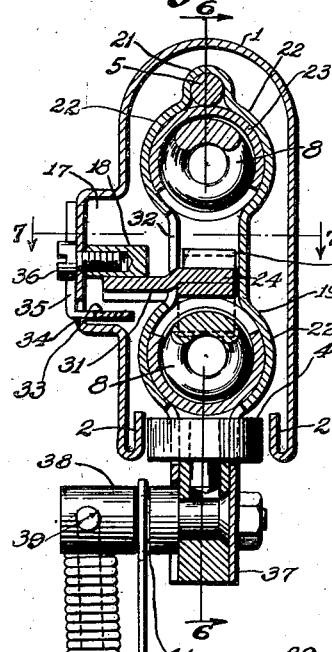
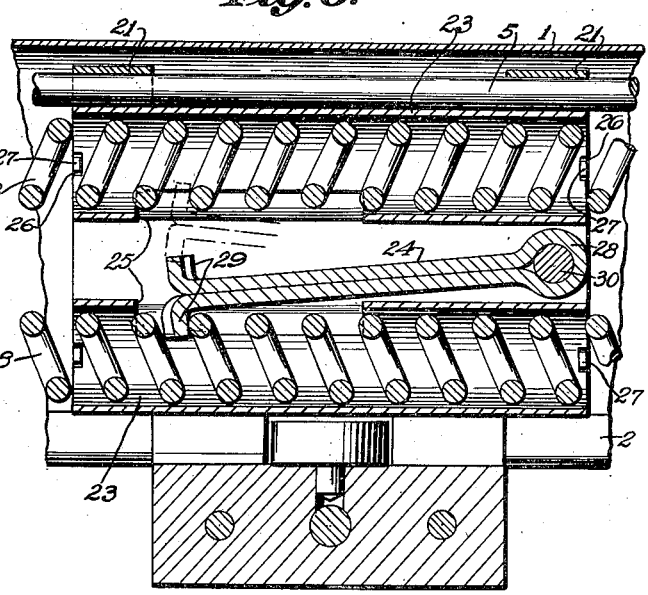
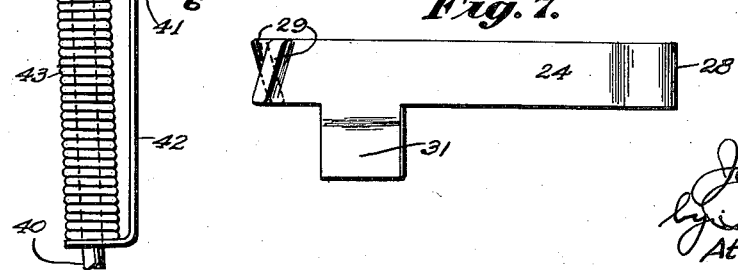
Inventor
John R. Oishei
By Barton A. Bean
Atty.

July 30, 1929.    J. R. OISHEI    1,722,535
RECIPROCATORY AUTOMATIC WINDSHIELD CLEANER
Filed Aug. 30, 1926    2 Sheets-Sheet 2
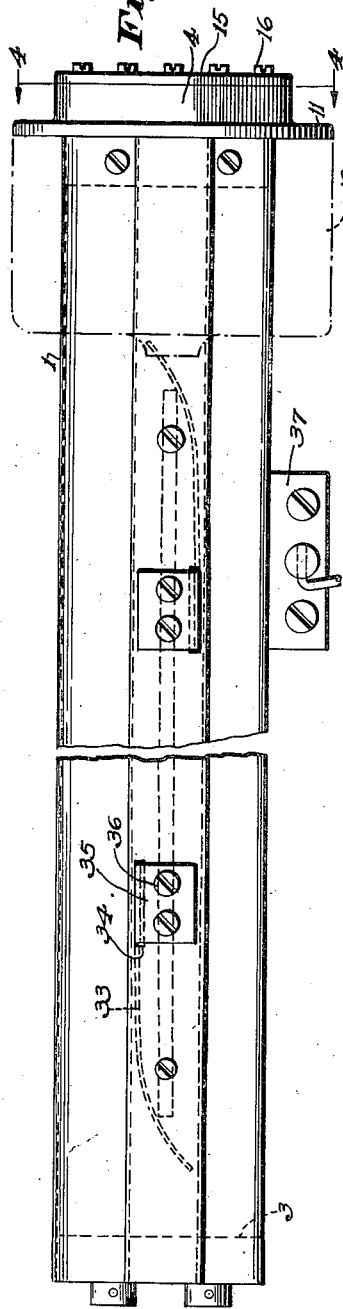
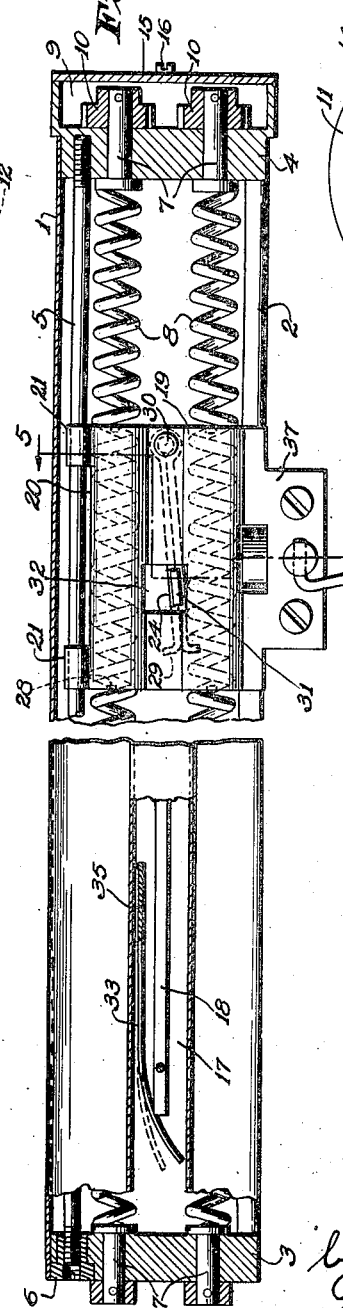
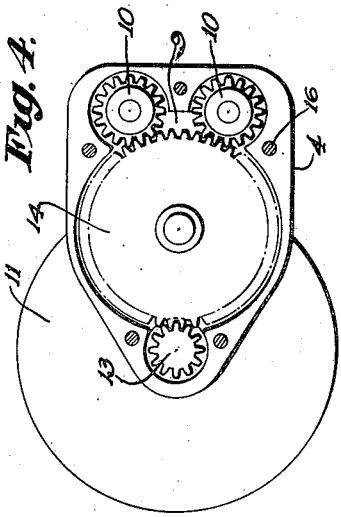

Patented July 30, 1929.

1,722,535

UNITED STATES PATENT OFFICE.

JOHN R. OISHEI, OF BUFFALO, NEW YORK, ASSIGNOR TO TRICO PRODUCTS CORPORATION, OF BUFFALO, NEW YORK.

RECIPROCATORY AUTOMATIC WINDSHIELD CLEANER.

Application filed August 30, 1926. Serial No. 132,388.

This invention relates to reciprocatory automatic windshield cleaners and more especially to that type in which the driving power is derived from an electric motor or an operating part of the motor vehicle.

In the class of reciprocating windshield cleaners, the mechanism utilized to move the wiper element back and forth on the windshield transparency, comprises a mechanical movement of which there are many forms, such as plural parallel screw shafts, a single diamond screw shaft, and an endless chain or belt.

The present invention is directed primarily to that class of mechanical movements embodying plural parallel screw shafts, and it has for its objects to simplify the manufacture of the individual screw shafts by forming the same of coiled wire, the coils of which form the threads; to provide a wiper carriage or shuttle movable in a direction axially of the shafts and embodying a switching device or connector for alternately engaging with the threads of the shafts for obtaining a reciprocatory driving force for the carriage; to provide reinforcing or steadying means for the immediate portion of the screw shafts engaged by the switching device or connector; to simplify the means for shifting the switching device or connector from engagement with the threads of one shaft into engagement with the threads of the companion shaft and securing the latter connection throughout the travel of the carriage between the switching points; and to mount the carriage and its wiper element in a manner insuring the most practical and efficient operation thereof.

In the drawings:
Fig. 1 is a front elevation of the improved automatic windshield cleaner mounted upon the windshield of a motor vehicle.

Fig. 2 is a rear elevation of the automatic windshield cleaner, partly broken away.
Fig. 3 is a view similar to Fig. 2, but being shown in part in longitudinal vertical section, to more clearly depict the interior construction and relation of the several elements.

Fig. 4 is a view on line 4—4 of Fig. 2, showing the power transmission between the source of power and the screw shafts.

Fig. 5 is a transverse section about on line 5—5, Fig. 3.

Fig. 6 is a detailed longitudinal section on line 6—6 of Fig. 5.

Fig. 7 is a detailed plan view of the connector or switching device.

Referring more in detail to the accompanying drawings, the numeral 1 depicts a casing or housing which is preferably stamped from sheet metal into an inverted U or trough shape, leaving its ends and bottom open, and having the lower marginal portions of the side walls about the open bottom inturned to provide guiding rails. The ends of the casing are closed by plates 3 and 4 which are tied together by a tie rod 5, said rod being threaded into the end plate 4 and having a clamping nut 6 co-acting with its opposite end to clamp the two end plates in position in the open ends of the casing and against relative separation. The end plates are provided with spaced journalled bearings for the trunnion portions or extensions 7 of the coiled screw shafts 8. The end plate 4 is enlarged to form a gear chamber 9 into which the adjacent ends of the shaft 7 extend for having fixed thereon the small pinions 10. On a lateral extension 11 of the end plate 4 is mounted an electric motor 12 which has the shaft of its rotor or armature extended into the gear chamber 9 and equipped with a small pinion or gear 13, which in turn meshes with a larger gear 14 for transmitting its power to the two gears 10 meshing therewith. A cover plate 15 is secured over the chamber 9 in a suitable manner such as by the screws 16. The rear wall of the casing 1 is grooved longitudinally to form an elongated pocket 17 in which is fixed a guard rail 18.

A wiper supporting carriage 19 is mounted for longitudinal movement within the casing, and preferably comprises a sheet metal body bent upon itself across a cut-out or opening 20 therein to provide a pair of spaced ears or loops 21 which slidably embrace the guiding tie rod 5 for suspending the carriage therefrom. The side walls of the carriage body or frame are provided with substantially semi-cylindrical and mating bulges or pockets 22 providing relatively superposed retaining pockets for the bushings or sleeves 23. The screw shafts extend through and are guided in these sleeves or bushings for steadying the same adjacent the point of engagement between the connector or switching device 24 and the threads or coils of the shafts, the adjacent opposing portions of the sleeves being cut away between the side walls of the carriage, as indicated at 25, so as to expose the coils to said connector 24. As a simple means of securing the sleeves in position, the same are provided in their opposite ends with small notches 26 into which are engaged the inwardly extending lugs 27 carried by the carriage body. The connector or switching device is also of a simple construction and is shown as being formed from a strip of metal bent midway upon itself to provide an eye 28, the extremities of the strip being turned away from each other and deflected according to the pitch of the respective screw shafts, as indicated at 29. The connector is disposed between the side walls of the carriage, and intermediate the sleeves 23, being pivoted on a transverse bolt 30 extending through the eye 28 thereby mounting the connector for swinging in a vertical plane from engaging relation with the threads of one shaft into meshing relation with the threads of the companion shaft. The connector is provided with a lateral arm 31 projecting through an opening 32 in the rear side wall of the carriage for riding upon the upper and lower faces of the fixed guard rail 18. When the arm 31 is riding on the under face of the guard rail, the lower lug 29 is positively held in engagement with the threads of the lower screw shaft, as indicated in Figs. 3, 5 and 6, until the arm rides off or from under the relatively forward end of said guard rail. When the arm 31 is riding on the upper face of the guard rail, the upper lug 29 is positively held in engagement with the threads of the upper screw shaft. Thus, the connector is positively prevented from accidentally becoming disengaged from its driving shaft between the power switching points.

As a means for effectively disengaging the connector from one shaft and coupling it with the companion shaft, there is provided resilient means which comes into play after the arm rides off the end of the guard rail. In the present disclosure, this resilient shifting means comprises a leaf spring 33 disposed within the longitudinal pocket 17 and adjacent each end of the guard rail. As a suitable mounting, the vertical wall of the pocket is provided respectively with upper and lower slots 34 through which angular extensions 35 of the springs are brought for being anchored against the exterior face of the vertical wall, as by fastening screws 36. The free end portions of the shifting springs normally curve across the adjacent ends of the guard rail and are adapted to be more or less straightened or flattened through flexing by the arm 31 riding between the spring and the rail whereby when the arm rides off the guard rail the stored-up energy of the spring will quickly snap the connector from engagement with the driving shaft into engagement with the idling shaft so that the latter will now function as the driving shaft and reverse the motion of the carriage. In view of the relative position of the coiled shafts, the arm 31 is alternately shifted upwardly and downwardly and consequently one spring shifting device will be disposed above the guard rail at one end thereof and the other shifting device will be disposed below the guard rail at the opposite end.

The carriage is provided with a depending wiper carrying part 37 which extends downwardly through the open bottom of the casing 1 and supports a rearwardly extending lug 38, the latter being provided with an opening 39 for receiving the upper end of the wiper carrying arm 40, and a groove 41 for receiving the upper end of the stirrup 42. The lower end of the stirrup engages about the wiper arm 40 and supports, under compression, a spring 43 which is coiled about the wiper arm 40 between the lower end of the stirrup and the stud 38 whereby the combined action of the spring and stirrup will urge the wiper element 44, which is supported on the lower end of the wiper carrying arm 40, to firmly and resiliently contact with the windshield glass. To further ease the operation of the wiper carriage and to guide it in its travel, the latter is provided with an antifriction roller 45 between the guiding rails 2 for contacting therewith as the carriage is reciprocated.

In the operation of the improved cleaner, the power derived from the motor 12 imparts a similar rotary movement to both screw shafts 8, the threads of one shaft being pitched oppositely to the threads of the companion shaft, so that, while the two shafts rotate in a common direction, the propelling forces of the two shafts are in opposition to each other. Obviously, if the pitch of the two shafts is common, the direction of rotation of one shaft would then have to be reversed relative to the direction of rotation of the companion shaft. Furthermore, the source of power might also be derived from the motor vehicle engine, or an electric motor located at a distant point on the motor vehicle body, and transmitted to the screw shafts by a flexible shaft, in an obvious manner. The screw shafts, being wound from a stiff wire or rod may be very economically and expeditiously manufactured, and by reason of the fact that the immediately engaged portion of each shaft is steadied by the carriage, such a shaft formation will prove practical in the type of mechanism set forth.

With the screw shafts in rotation and the connector engaging the lower shaft, as in Figs. 3, 5 and 6, the carriage will be moved or driven to the right until the arm 31 rides from under the guard rail 18 when the adjacent shifting device 33 will immediately swing the connector up through the opening 25 of the upper sleeve 23 into engagement with the reinforced coils of the upper shaft 8 when the carriage will immediately begin its retrograde movement with the arm 31 riding on the upper face of said guard rail. As the carriage approaches its left limit of movement, referring to Fig. 3, and as the arm 31 rides off from the left end of the guard rail, the spring device 33 will immediately shift the connector down through the opening 25 of the lower sleeve or bushing 23 into engagement with the lower screw shaft, whereupon the cycle of movement for the carriage will be repeated.

What I claim as new is:

1. An actuating mechanism for a windshield cleaner comprising a casing having a longitudinal slot, a fixed guide rod arranged within the casing, a carriage slidably suspended on the rod and having a part projecting through the casing slot for supporting a wiper element, a pair of oppositely rotating screw shafts journalled in the ends of said housing and extending through the carriage, a connector pivoted on the carriage between the shafts for alternate engagement with the threads of the latter, and a guard on the casing alongside the path of travel of the connector for holding the latter in engagement with either screw shaft.

2. A windshield cleaner comprising a casing open at its under side, a guide rod within the upper portion of the casing, a wiper carriage slidably suspended on the guide rod, a pair of relatively superposed screw shafts extending through the carriage, a connector pivoted on the carriage between the shafts for vertically swinging into engagement with the threads of either shaft, and means for automatically switching the connector from one shaft to the other.

3. A windshield cleaner comprising a casing open at its under side, a guide rod within the upper portion of the casing, a wiper carriage slidably suspended on the guide rod, a pair of relatively superposed screw shafts extending through the carriage, a connector pivoted on the carriage between the shafts for vertically swinging into engagement with the threads of either shaft, an arm on the connector extending laterally from the carriage, and a longitudinal guard fixed alongside of the path of travel of said arm for holding the connector intermeshed with either screw shaft.

4. A windshield cleaner comprising spaced screw shafts, a carriage, a wiper operable by the carriage, a connector pivoted on the carriage for intermeshing with the threads of either shaft, a guard rail along the opposite sides of which said connector is adapted to slide for maintaining a pre-established connection between the connector and the respective shafts, and means for establishing a connection between the carriage and one shaft as the connector rides off the end of said guard rail from engagement with the companion shaft.

5. A windshield cleaner comprising spaced screw shafts, a carriage, a wiper operable by the carriage, a connector pivoted on the carriage for intermeshing with the threads of either shaft, a guard rail along the opposite sides of which said connector is adapted to slide for maintaining a pre-established connection between the connector and the respective shafts, and resilient means adapted to be placed under tension by and during movement of the carriage at each limit of its movement for expending its thus stored-up energy in effecting a shift of the connector from engagement with one shaft to an engagement with the companion shaft.

6. A windshield cleaner comprising spaced screw shafts, a carriage, a wiper operable by the carriage, a connector pivoted on the carriage for intermeshing with the threads of either shaft, a guard rail along the opposite sides of which said connector is adapted to slide for maintaining a pre-established connection between the connector and the respective shafts, and a leaf spring normally extending across each end of the guard rail and adapted to be flexed under tension by the connector passing therebeneath for storing up energy to disengage the connector from one shaft and engage it with the companion shaft after said connector rides off the respective end of said guard rail.

7. An actuating mechanism for a windshield cleaner comprising a guide, a carriage mounted to slide thereon and embodying spaced tubular portions, a pair of screw shafts each extending through a respective tubular guide of said carriage and consisting of a section of wire coiled to an outside diameter slightly less than the inside diameter of said tubular guide, the latter acting to reinforce and steady the immediate inclosed section of the respective coiled shaft, means for rotating the shafts, and means on the carriage for successively engaging the coils of the inclosed shaft sections for effecting a driving connection between the carriage and the shafts.

8. A windshield cleaner comprising a pair of shafts, each coiled from a length of wire to form a driving screw, a wiper, a carriage for the wiper, a connector movable on the carriage for engaging with the coils of each shaft to be driven thereby, and means movable with the carriage for steadying and guiding the coils of the shafts adjacent the points of engagement between the connector and said shafts.

9. An actuating mechanism for a windshield cleaner comprising spaced shafts of coiled wire formation, a reciprocatory carriage embodying spaced guides through which the shafts extend for having their immediate portions steadied thereby, a connector on the carriage for alternately connecting the latter to either shaft, said connector being movable into engagement with the thread-forming coils at a point adjacent said guides for advancing the carriage in a direction accordingly, and means for shifting the connector from one shaft to the other shaft.

10. An actuating mechanism for a windshield cleaner comprising spaced shafts of coiled wire formation, a reciprocatory carriage embodying spaced guides through which the shafts extend for having their immediate portions steadied thereby, a connector on the carriage for alternately connecting the latter to either shaft, said connector being movable into engagement with the thread-forming coils at a point adjacent said guides for advancing the carriage, a guard rail fixed alongside the path of movement of the carriage, and a part connected to said connector for cooperating with the rail in securing the same against disengagement from its connected shaft during the travel of said carriage between its limits of movement.

11. A windshield cleaner comprising a coiled screw shaft, a wiper carriage slidable lengthwise thereof and having a tubular guide through which the shaft extends, one side of the guide having an opening therein, a connector mounted on the carriage for projection through the opening of said tubular guide into engagement with the thread-forming coils of said shaft, and means for intermittently engaging the connector with the shaft.

12. A windshield cleaner actuating mechanism comprising a carriage having spaced retainer pockets, a connector mounted for projection into either pocket, a sleeve removably secured in each pocket, a pair of screw shafts each extending through a respective sleeve and each sleeve being formed with an opening through which the connector is projectible for engaging with the respective shaft, and means for controlling the connector.

13. In a windshield cleaner, spaced screw shafts, a carriage, said screw shafts being adapted to drive said carriage in opposite directions, a connector for coupling the carriage alternately to each shaft, whereby the carriage is reciprocated along said shafts, means for effecting a change-over of the connector from one shaft to the companion shaft at the opposite limits of travel of the carriage, and a single means in a plane between said shafts for positively securing the coupled relation between the connector and the driving shaft while the carriage is intermediate its limits of travel.

14. A windshield cleaner comprising a reciprocatory wiper operating member having a stud extending substantially at right angles to and in front of the windshield glass and having a transverse opening, and a seat, said opening being arranged closer to the free end of said stud than the seat, a wiper carrying arm having its upper end engaged in the opening of said member, a spring coiled about the upper end of the arm, and a stirrup supporting the spring under compression and engaged in the seat of said operating member whereby said wiper arm will be urged toward the windshield.

15. A windshield cleaner comprising a sheet metal casing of inverted trough form, end plates closing the ends of the casing, a tie rod connecting the two end plates against relative separation, a carriage within the casing, said tie rod extending through the casing and slidably supporting the carriage, wiper supporting means extending through the open bottom of the casing, and means operating within the casing for reciprocating the carriage on the tie rod.

16. A windshield cleaner actuating mechanism comprising a casing, coiled shafts journalled in the ends of the casing, a carriage having spaced sleeves enclosing portions of the coil shafts, means for rotating the shafts, and means for alternately connecting the carriage to the portions of the shafts enclosed by said sleeves.

17. A windshield cleaner actuating mechanism comprising a casing, a carriage reciprocating therein, spaced screw shafts within the casing, a connector movable on the carriage between the screw shafts for coupling the carriage alternately to the shafts, said casing having a longitudinal recess with a fixed guard rail therein extending along the path of travel of the carriage, said connector having a part extending to engage the guard rail for alternately riding upon its opposite faces whereby the guard rail will maintain a pre-established connection between the connector and either shaft, and means for establishing a connection between the connector and one shaft as the connector part rides off the guard rail from connection with the companion shaft.

18. A windshield cleaner actuating mechanism comprising spaced screw shafts, means for journalling the spaced shafts, a guide rod extending lengthwise of said shafts, a carriage slidably supported on said rod and receiving the screw shafts, a connector pivoted on the carriage between the shafts and adapted for swinging movement from engagement with one shaft into engagement with the companion shaft, and a shifting device arranged adjacent the limits of movement of the carriage for effecting a shifting of the connector from engagement with one shaft into engagement with the companion shaft.

19. A windshield cleaner actuating mechanism comprising a casing, spaced screw shafts journalled thereon in relatively superposed relation, a guide rod within the casing above the shafts, a carriage stamped from sheet metal and bent upon itself about the rod for suspending the carriage for reciprocating movement, relatively superposed sleeves engaged between the opposite wall portions of said carriage and guidingly receiving the respective shafts, the opposing sides of said sleeves being cut away to expose the threads of said shafts, a connector movably mounted on the carriage between the sleeves and having parts for alternately projecting through the cut-outs of the sleeves into engagement with the threads of the shafts, and means for shifting the connector from engagement with one shaft into engagement with the companion shaft.

20. A windshield cleaner actuating mechanism comprising a casing, spaced shafts therein, a slidably mounted carriage constructed from a sheet metal blank bent upon itself and shaped to form complemental pockets on opposite sides of the shafts, a sleeve enclosing each shaft and interposed between the sections of the complemental pockets, said sleeve being interlocked with the carriage body against displacement, and means for alternately connecting the carriage to the screw shafts.

21. A windshield cleaner actuating mechanism comprising a carriage, a coiled shaft for driving the same, means for connecting the carriage to the shaft, and means carried by the carriage for steadying the portion of the shaft adjacent the point of connection between the shaft and said connecting means.

22. A windshield cleaner actuating mechanism comprising a slidably mounted carriage having a tubular opening therethrough, a coiled shaft substantially fitting the tubular opening and passing therethrough whereby the walls of the tubular opening will act to steady and reinforce the enclosed coils of the shaft, means for operatively connecting the carriage to the shaft at a point within the tubular opening of said carriage.

23. A windshield cleaner comprising a sheet metal casing bent into substantially U-form with the free marginal edges thereof inturned upon themselves to form opposing guide rails, a carriage slidably mounted within the casing and projecting between the rails in guiding relation thereto, means within the casing for sliding the carriage lengthwise of the guide rails, and a wiper connected to the projecting part of the carriage.

24. A windshield cleaner comprising a casing, spaced screw shafts therein, a wiper carriage movable along the shafts when coupled with either, and a connector pivoted on the carriage for swinging between the shafts from engagement with one shaft into engagement with the other shaft, whereby said carriage is moved by said shafts.

25. A windshield cleaner comprising a casing, spaced screw shafts therein, a wiper carriage movable along the shafts when coupled with either, a connector movable on the carriage for alternately coupling the shafts to the carriage, and a spring device arranged adjacent each limit of travel of the carriage and engageable with a part of said connector for disengaging the latter from one shaft and engaging the connector with the companion shaft.

26. A windshield cleaner comprising a casing, spaced screw shafts therein, a wiper carriage movable along the shafts when coupled with either, a connector movable on the carriage for alternately coupling the shafts to the carriage, a leaf spring mounted adjacent each limit of travel of the connector to extend across the path of a part of said connector for being engaged thereby and flexed abnormally, whereby energy is stored up in the engaged spring for being expended in effecting a disengagement of the connector from one shaft and an engagement of the connector with the companion shaft, and means for holding the connector against disengagement until the adjacent spring has been abnormally flexed to a substantial extent.

27. A windshield cleaner comprising a casing, spaced screw shafts therein, a wiper carriage movable along the shaft when coupled with either, a connector movable on the carriage for alternately coupling the shafts to the carriage, a guard rail extending alongside the path of travel of the connector for positively holding the latter against unauthorized disengagement from either screw between the limits of travel of said connector, and a leaf spring adjacent each end of the guard rail on opposite sides thereof and normally and yieldably extending across the adjacent end of said rail for being engaged by said connector and flexed away from said rail so as to shift the connector into engagement with the idling shaft when said connector rides off the end of said rail.

28. In a windshield cleaner actuating mechanism, a pair of driving members, a support for said driving members, a carriage adapted to operate a wiping element, one of said driving members being adapted to move said carriage in one direction and the other of said driving members being adapted to move said carriage in an opposite direction, a connecting member connected to said carriage and having parts adapted to engage said driving members, a fixed member on said support, a part on said connecting member for engaging said fixed member, whereby during movement of said carriage in one direction said connecting member is maintained connected to one of said driving members and during movement of said carriage in the opposite direction is maintained connected to said other driving member, and resilient means at each end of said fixed member and operable respectively upwardly and downwardly on said connecting member when the last named part of said connecting member is disengaged from said fixed member for quickly snapping said connecting member from engagement with one driving member into engagement with the other driving member.

29. In a windshield cleaner, two oppositely propelling driving members, a wiper operating carriage, a connector for coupling the carriage alternately to the driving members whereby the carriage is accorded a reciprocatory movement, and resilient means at each end of the limit of movement of said carriage for intermittently uncoupling the connector from one driving member and moving it into a coupled relation with the other driving member.

30. A windshield wiper comprising a casing, a carriage slidably suspended therein for movement lengthwise thereof, vertically spaced driving members arranged beneath the point of suspension of the carriage and adapted to successively operate on said carriage for moving the same back and forth, a coupler carried by the carriage and movable from engagement with one of said driving members into engagement with the other of said driving members and having a laterally extending arm, a guard rail secured to the casing and engageable by the arm for holding said coupler operative, and a wiper dependently carried by the carriage.

31. A windshield cleaner comprising a metal casing of substantially inverted U-form having its depending and opposing marginal edges inturned upon themselves to form spaced guard rails, a carriage slidably suspended in the upper part of the casing and depending between said guard rails and being guided and steadied thereby, means for sliding the carriage on its suspension, and a wiper operable by the depending and protruding portion of the carriage.

JOHN R. OISHEI.